Patented Aug. 27, 1935

2,012,411

UNITED STATES PATENT OFFICE 2,012,411

PROCESS OF FORMING UREA-FORMALDEHYDE CONDENSATION PRODUCTS

Ludwig W. Wasum, Hackensack, N. J., assignor to Crystalite Corporation of America, New York, N. Y.

No Drawing. Application February 28, 1933, Serial No. 658,945

18 Claims. (Cl. 260—3)

My invention relates to a process of forming urea formaldehyde condensation products of an advantageous character and which are capable of application to many different industries, as, for example, plastics, jewelry, buttons, wall coverings, paper impregnation, coatings, molding powders, etc.

The object of my invention is to provide a process by means of which an urea formaldehyde condensation product of the above character may be readily obtained and which may, in accordance with my invention, result in the formation of a product which is colorless and transparent. Another object is to provide a process by which a product may be obtained that is so clear and colorless that when cut and polished will have an appearance substantially the same as a gem, as for example, a diamond. Another object is to provide a process by means of which there is obtained a product of the above character having a high resistance towards water and chemical substances, such, for example, as weak alkalies and acids. Further objects of my invention will appear from the detailed description of the same hereinafter.

While my invention is capable of embodiment in different ways I have described hereinafter only certain ways in which my invention may be carried out.

In carrying out my invention I utilize as a catalyst a source of silica or a gel of silica. Preferably, this is in the form of activated silica gel, although, instead, I may use a soluble silicate such, for example, as a sodium or potassium silicate solution from which silica is separated out in accordance with my process. When using the soluble silicate solution I condense, preferably by the application of heat, 1 mol. of urea with 2 to 2.5 mols. of formaldehyde in the presence of an alkali silicate, as, for instance, a sodium silicate solution in a proportion such as hereinafter referred to, a slightly acid or neutral 40% commercial formaldehyde solution being used and a commercial sodium silicate water solution of about 40 to 42° Bé. or a more dilute solution thereof being used. If during the process a concentrated solution of sodium silicate is being used, a part of the silica is separated out as a gel, only a very small amount of the silica being precipitated, however, from the more dilute solutions of the sodium silicate. I find it is advantageous, however, to use the concentrated solutions of the silicate. In carrying out the condensation the urea may be dissolved in the formaldehyde solution, the sodium silicate solution being then slowly added while the urea formaldehyde solution is being agitated, the mixture being then subjected to boiling under a reflux condenser. After boiling for about 5–10 minutes the pH of the mixture is adjusted to from 3.5 to 5.0 by adding any water soluble organic or inorganic acid or acid substance, as, for example, acetic acid or lactic acid or sulphuric acid or hydrochloric acid, the boiling being continued while the mixture is agitated. The silica is separated out in a finely divided state which can be filtered off after the condensation. A clear colorless water solution of the condensation product is thus obtained. After adding a small amount of a retarding agent, such as a compound of a strong base with a weak acid, such, for example, as sodium acetate, the water is distilled off under a vacuum at 40 to 50° C. A small amount of urea may then be added, as, for instance, about $\frac{1}{10}$ times the amount of urea added initially, to combine with any free formaldehyde present. Also, a hardening accelerator may be added, as, for instance, ammonium chloride or formic acid or some other acid or acid substance, and at the same time, if desired, a plasticizer can be added, as, for example, a higher organic alcohol, such, for instance, as diethylene glycol or glycerine. The viscous product may then be poured into molds and hardened at a temperature of 50 to 100° C. If desired it can be dried in a vacuum and can then be ground up to a fine powder which can be molded under heat and pressure. The product obtained has complete transparency and high resistance towards water and chemical substances, such as weak alkalies and acids. The initial water solution of the condensation product obtained after the filtering off of the silica, may also be used for impregnation of paper, wood, etc., or may be mixed with filling materials, such as wood flour or asbestos, plasticizers, coloring substances, etc., and after drying and grinding, can be shaped into articles by molding under heat and pressure.

In carrying out my process, however, preferably instead of utilizing an alkali silicate solution I make use of activated silica gel as a catalyst. In this case my invention may be carried out by first boiling under a reflux condenser a slightly acid commercial 40% formaldehyde solution with finely powdered activated silica gel in the proportions such as those hereinafter mentioned. The silica gel is kept in suspension by agitation. After the mixture has been boiling about ten minutes urea is gradually added to the boiling mixture in such amounts that a proportion of 1 mol of urea to 2 to 2.5 mols of formaldehyde is attained. After the urea has been added the retarding agent, such as has been above referred to, may be added and the activated silica gel is filtered off. The clear colorless solution of the condensation product may then be treated in the same way as the water solution thereof obtained as described above when using sodium silicate as the condensing agent. As specific examples of my invention I may proceed as follows:

Example 1

10 kg. urea are dissolved in 25.8 kg. of a commercial 40% formaledhyde solution, and 0.3 kg. of a commercial sodium silicate solution (40–42° Bé.) are slowly added under good agitation. The mixture is heated to boiling under reflux for about 5–10 minutes, 0.42 kg. of 56% strength acetic acid are added, and the boiling is continued for 10 minutes. The pH of the mixture is then adjusted to 4.5–4.8 by adding 0.15 to 0.25 kg. of sodium acetate. After the mixture has been boiled again for 5 minutes, the precipitated silicic acid is filtered off.

Example 2

25.8 kg. of commercial 40% formaldehyde solution of pH 3.0–4.5 are boiled under reflux with 0.4 kg. of finely powdered activated silica gel for 5–10 minutes. 10 kg. of urea are then gradually added to the boiling mixture in about 7 to 8 equal portions, and within 20–25 minutes. The mixture being well agitated. Before the last portion of urea is added, the pH of the mixture is adjusted to 4.5–4.8 by the addition of 0.15–0.25 kg. of sodium acetate. After cooling down to about 50–60° C. the silica gel is filtered off.

The clear colorless water solution, obtained by either one of the two procedures, is concentrated under vacuum below 50° C. until a viscous liquid is obtained. This liquid is well mixed with 2.2 kg. of diethylene glycol, 2.5 kg. of glycerol as plasticizers and 0.05 kg. of ammonium chloride as a hardening accelerator. The viscous mass is poured into molds and hardened at 55–100° C. It also can be partially hardened, broken into pieces, powdered, and can then be molded under heat and pressure. The viscous material also can be mixed with filling materials, such as wood flour, asbestos etc., and can then be molded under heat and pressure after having been first powdered. Coloring materials of any known character also can be added to any of these products.

It is of course to be understood that the proportions of the above materials may be widely varied within the range of the purposes for which they are used and to which they are to be applied.

While I have described my invention above in detail I wish it to be understood that many changes may be made therein without departing from the spirit of the same.

I claim:

1. The process which comprises forming a dry urea formaldehyde condensation product substantially insoluble in water by condensing urea and formaldehyde in the presence of a gel of silica.

2. The process which comprises forming a dry urea formaldehyde condensation product substantially insoluble in water by condensing urea and formaldehyde in the presence of an activated silica gel.

3. The process which comprises forming an urea formaldehyde condensation product by condensing urea and formaldehyde in the presence of an alkali silicate forming a gel of silica.

4. The process which comprises forming a dry urea formaldehyde condensation product substantially insoluble in water by condensing urea and formaldehyde in the presence of a gel of silica and then filtering off silica.

5. The process which comprises forming a dry urea formaldehyde condensation product substantially insoluble in water by condensing urea and formaldehyde in the presence of an activated silica gel and then filtering off silica.

6. The process which comprises forming an urea formaldehyde condensation product by condensing urea and formaldehyde in the presence of an alkali silicate forming a gel of silica, and then filtering off silica.

7. The process which comprises forming an urea formaldehyde condensation product by condensing urea and slightly acid formaldehyde in the presence of an alkali silicate thereby precipitating part of the silica as a gel.

8. The process which comprises forming an urea formaldehyde condensation product by condensing urea and slightly acid formaldehyde in the presence of an alkali silicate thereby precipitating part of the silica as a gel, then adding an acid and continuing the condensation.

9. The process which comprises forming a dry urea formaldehyde condensation product substantially insoluble in water, involving condensing urea and formaldehyde in the presence of a gel of silica while boiling for not more than approximately thirty five minutes.

10. The process which comprises forming a dry urea formaldehyde condensation product substantially insoluble in water, involving condensing urea and formaldehyde in the presence of an activated silica gel while boiling for not more than approximately thirty five minutes.

11. The process which comprises producing an urea formaldehyde condensation product by condensing urea and formaldehyde in the presence of a gel of silica by boiling for not more than approximately 35 minutes, and filtering off the silica.

12. The process which comprises producing an urea formaldehyde condensation product by condensing urea and formaldehyde in the presence of a gel of silica by boiling for not more than approximately 35 minutes, adding an acetate, and filtering off the silica.

13. The process which comprises producing a dry urea formaldehyde condensation product substantially insoluble in water by condensing urea and formaldehyde in the presence of a gel of silica by boiling for not more than approximately 35 minutes, filtering off the silica, then concentrating the solution and allowing the product to harden.

14. The process which comprises producing a dry urea formaldehyde condensation product substantially insoluble in water by condensing urea and formaldehyde in the presence of a gel of silica by boiling for not more than approximately 35 minutes, adding an acetate, filtering off the silica, then concentrating the solution and allowing the product to harden.

15. The process which comprises producing an urea formaldehyde condensation product by condensing urea and formaldehyde in the presence of an activated silica gel by boiling for not more than approximately 35 minutes, and filtering off the silica.

16. The process which comprises producing an urea formaldehyde condensation product by condensing urea and formaldehyde in the presence of an activated silica gel by boiling for not more than approximately 35 minutes, adding an acetate, and filtering off the silica.

17. The process which comprises producing a dry urea formaldehyde condensation product substantially insoluble in water by condensing urea and formaldehyde in the presence of an activated silica gel by boiling for not more than approximately 35 minutes, filtering off the silica, then concentrating the solution and allowing the product to harden.

18. The process which comprises producing a dry urea formaldehyde condensation product substantially insoluble in water by condensing urea and formaldehyde in the presence of an activated silica gel by boiling for not more than approximately 35 minutes, adding an acetate, filtering off the silica, then concentrating the solution and allowing the product to harden.

LUDWIG W. WASUM.